United States Patent
Tsao et al.

(10) Patent No.: US 9,888,386 B2
(45) Date of Patent: Feb. 6, 2018

(54) COMMUNICATION APPARATUS AND SETTING METHOD TO ENHANCE SAFETY AND EASE USE THEREOF

(71) Applicant: Getac Technology Corporation, Hsinchu County (TW)

(72) Inventors: Hsuan-Wei Tsao, Taipei (TW); Jiunn-Jye Lee, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 14/958,079

(22) Filed: Dec. 3, 2015

(65) Prior Publication Data
US 2017/0164197 A1   Jun. 8, 2017

(51) Int. Cl.
| | |
|---|---|
| *H04M 3/16* | (2006.01) |
| *H04W 12/08* | (2009.01) |
| *H04W 4/14* | (2009.01) |
| *H04L 12/58* | (2006.01) |
| *H04W 12/10* | (2009.01) |

(52) U.S. Cl.
CPC ............. *H04W 12/08* (2013.01); *H04L 51/18* (2013.01); *H04W 4/14* (2013.01); *H04W 12/10* (2013.01)

(58) Field of Classification Search
CPC ....... H04W 12/08; H04W 4/14; H04W 12/10; H04W 8/245; H04L 51/18; G06F 8/65; H04M 1/72525
USPC ..... 455/410, 411, 414.2, 418, 419, 466, 566
See application file for complete search history.

(56) References Cited

U.S. PATENT DOCUMENTS

| | | | | |
|---|---|---|---|---|
| 6,301,484 | B1 * | 10/2001 | Rogers ....................... | G06F 8/65 455/186.1 |
| 8,538,815 | B2 * | 9/2013 | Mahaffey ........... | G06Q 30/0269 705/14.64 |
| 2002/0187794 | A1 * | 12/2002 | Fostick ............... | H04L 12/5895 455/466 |

(Continued)

FOREIGN PATENT DOCUMENTS

WO    WO2015099295 A1 *  7/2015

*Primary Examiner* — Kathy Wang-Hurst
*Assistant Examiner* — B. M. M Hannan
(74) *Attorney, Agent, or Firm* — Locke Lord LLP; Tim Tingking Xia, Esq.

(57) ABSTRACT

A communication apparatus and its setting method are provided. The communication apparatus has a processor and a memory device storing a short message receiving module configured to, when executed by the processor, determine whether the short message received by the communication apparatus conforms with a predetermined format. The short message includes an unencrypted prefix and multiple encrypted fields including a device serial number of the communication apparatus, a time at which the short message is sent and an operation command that controls the communication apparatus to execute a corresponding operation. The short message received by the communication apparatus is decoded to obtain the operation command when the short message conforms with the predetermined format. The operation command controls the communication apparatus to execute the corresponding operation, and the predetermined format includes at least an unencrypted field and at least an encrypted field.

10 Claims, 2 Drawing Sheets

(56) References Cited

U.S. PATENT DOCUMENTS

| | | | |
|---|---|---|---|
| 2008/0025343 A1* | 1/2008 | Rangel | H04L 69/16 370/469 |
| 2009/0075630 A1* | 3/2009 | McLean | G06F 21/602 455/411 |
| 2012/0254324 A1* | 10/2012 | Majeti | H04L 51/18 709/206 |
| 2012/0254329 A1* | 10/2012 | Majeti | G06F 21/10 709/206 |
| 2013/0090110 A1* | 4/2013 | Cloonan | H04W 8/245 455/420 |
| 2013/0237204 A1* | 9/2013 | Buck | H04M 1/72569 455/418 |
| 2013/0318216 A1* | 11/2013 | Sakamaki | H04L 41/0813 709/221 |
| 2015/0094029 A1* | 4/2015 | Feng | H04W 12/12 455/411 |
| 2015/0244659 A1* | 8/2015 | Kim | H04L 51/066 709/206 |
| 2015/0294301 A1* | 10/2015 | Lindfeldt | G06Q 30/06 705/72 |
| 2016/0285854 A1* | 9/2016 | Hu | G06F 21/88 |
| 2016/0294785 A1* | 10/2016 | Lim | G06F 21/6209 |

\* cited by examiner

COMMUNICATION APPARATUS AND SETTING METHOD TO ENHANCE SAFETY AND EASE USE THEREOF

BACKGROUND OF THE INVENTION

Field of the Invention

The present invention relates to electronic devices and more particularly to a communication apparatus and a setting method thereof.

Description of the Prior Art

Most of the functions of commercially available communication apparatuses are started and shut down by hand. For instance, wireless networks, Bluetooth, and global positioning systems are started and shut down only by users who exercise control over them by operating them directly, for example, using a touchscreen to set related parameters. In general, commercially available communication apparatuses are advantageously portable and compact, albeit at the cost of a high chance of getting lost or stolen. Since communication apparatuses can only be configured and managed by hand, they are likely to cause infringement of personal privacy and leakage of important data. Furthermore, the odds are that global positioning systems will be shut down by a third party and thus will fail to locate the position of the communication apparatuses, thereby adding to the difficulty in finding communication apparatuses.

SUMMARY OF THE INVENTION

The present invention provides a communication apparatus and a setting method thereof to enhance the safety and ease of use of the communication apparatus greatly.

The communication apparatus of the present invention comprises a short message receiving unit and a short message managing unit. The short message receiving unit determines whether a short message received by the communication apparatus conforms with a predetermined format. If the short message conforms with the predetermined format, the short message receiving unit sends the short message to the short message managing unit such that the short message managing unit decodes the short message to obtain an operation command, wherein the operation command controls the communication apparatus to execute a corresponding operation. The predetermined format includes at least an unencrypted field and at least an encrypted field.

In an embodiment of the present invention, the short message managing unit processes the short message in a framework layer.

In an embodiment of the present invention, the unencrypted field is a prefix, and the encrypted field includes at least a certification data and the operation command.

In an embodiment of the present invention, the certification data includes a device serial number and the time at which the short message is sent.

In an embodiment of the present invention, the short message managing unit further determines whether the device serial number matches the device serial number of the communication apparatus and whether the interval between receiving the short message and sending the short message is shorter than a predetermined period of time, wherein the communication apparatus does not execute an operation corresponding to the operation command when the interval is not shorter than the predetermined period of time.

In an embodiment of the present invention, if the short message managing unit determines that the device serial number does not match the device serial number of the communication apparatus, the communication apparatus will not execute an operation corresponding to the operation command.

A setting method of a communication apparatus according to the present invention comprises the steps of: determining whether a short message received by the communication apparatus conforms with the predetermined format; decoding the short message to obtain an operation command if the short message conforms with the predetermined format, wherein the operation command controls the communication apparatus to execute a corresponding operation, and the predetermined format includes at least an unencrypted field and at least an encrypted field.

In an embodiment of the present invention, the short message is processed in the framework layer.

In an embodiment of the present invention, the unencrypted field is a prefix, and the encrypted field includes at least a certification data and the operation command such that the short message is sent to the communication apparatus after being included with the at least a certification data and encrypted.

In an embodiment of the present invention, the certification data includes the device serial number and the time at which the short message is sent.

In an embodiment of the present invention, the setting method of a communication apparatus further comprises the steps of: determining whether the device serial number matches a device serial number of the communication apparatus and whether an interval between receiving the short message and sending the short message is shorter than a predetermined period of time; and not executing an operation corresponding to the operation command by the communication apparatus if the interval is not shorter than the predetermined period of time.

In an embodiment of the present invention, if the device serial number does not match the device serial number of the communication apparatus, the communication apparatus will not execute an operation corresponding to an operation command.

Therefore, in an embodiment of the present invention, when a short message received by the communication apparatus conforms with the predetermined format, the communication apparatus decodes the short message to obtain an operation command. The operation command controls the communication apparatus to execute a corresponding operation. The predetermined format includes at least an unencrypted field and at least an encrypted field. By sending the short message, it is feasible to operate and control the communication apparatus, thereby enhancing the ease of use of the communication apparatus greatly. The encrypted field and the predetermined format of the short message are effective in ensuring the security of the data of the communication apparatus.

To render the aforesaid features and advantages of the present invention obvious and comprehensible, the present invention is hereunder illustrated with embodiments and drawings and described in detail.

DETAILED DESCRIPTION OF THE EMBODIMENTS

Figure 1:
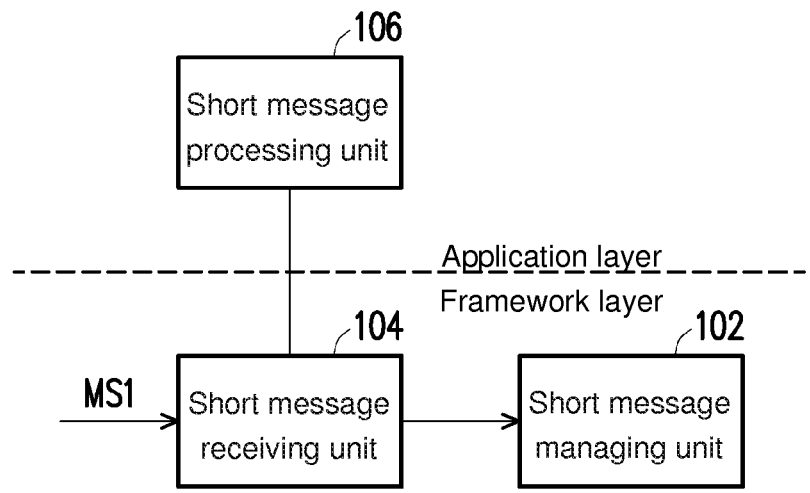
FIG. 1 is a schematic view of a communication apparatus according to an embodiment of the present invention.

FIG. 1 is a schematic view of a communication apparatus according to an embodiment of the present invention. Referring to FIG. 1, the communication apparatus is an electronic device, such as a mobile phone or a tablet, and comprises a short message managing unit 102, a short message receiving unit 104, and a short message receiving unit 104 for determining whether short message MS1 received by the communication apparatus conforms with a predetermined format. If short message MS1 conforms with the predetermined format, short message MS1 will be sent to the short message managing unit 102, so as for the short message managing unit 102 to decode short message MS1 and thus obtain an operation command. The operation command controls the communication apparatus to execute a corresponding operation. The predetermined format (to be described in detail later) includes at least an unencrypted field and at least an encrypted field. Conversely, if short message MS1 does not conform with the predetermined format, the short message receiving unit 104 will send short message MS1 to a short message processing unit 106 to perform conventional packet processing. The short message managing unit 102, the short message receiving unit 104 and the short message processing unit 106 are stored in a memory device (not shown) and thus executed by a processor (not shown). The short message managing unit 102 and the short message receiving unit 104 process short message MS1 in a framework layer. The short message processing unit 106 processes short message MS1 in an application layer.

The essential technical features of the present invention are further described below. Controlling the operation of the communication apparatus with short message MS1 not only enhances the ease of use of the communication apparatus but also enhances the security of the communication apparatus. In this regard, the security of the communication apparatus is enhanced, because, in the situation where short message MS1 conforms with the predetermined format, short message MS1 is always processed in the framework layer and thus never sent to the application layer for processing, and in consequence the communication apparatus does not broadcast any video signal to notify users when controlling, with a short message MS1, the communication apparatus to operate. For example, if the communication apparatus gets lost, the owner of the communication apparatus can send short message MS1 to the communication apparatus to control the communication apparatus to start the global positioning function thereof such that the owner can locate the position of the communication apparatus. Furthermore, with the aforesaid function being performed in the background, any person in possession of the lost communication apparatus illegally cannot shut down the communication apparatus even though the person is aware that the owner is looking for the communication apparatus. In another variant embodiment, the communication apparatus has its screen locked so as to enter the lost mode whereby any person who finds the lost communication apparatus is prevented from reading data stored in the communication apparatus, thereby ensuring data security of the communication apparatus efficiently. Moreover, short message MS1 is absent from the application layer and thus unlikely to be intercepted by any third party in an attempt to access data contained in short message MS1. Even if short message MS1 is intercepted by a third party, the third party cannot gain easy access to the data contained in short message MS1 because short message MS1 is already encrypted, thereby further ensuring data security of the communication apparatus efficiently. Algorithms for use with the aforesaid encryption fall into two categories, namely symmetric-key algorithms and asymmetric-key algorithms. The symmetric-key algorithms include data encryption standard (DES), advanced encryption standard (AES) and RC6 encryption (Rivest cipher 6). Examples of the asymmetric-key algorithms include RSA.

Figure 2:
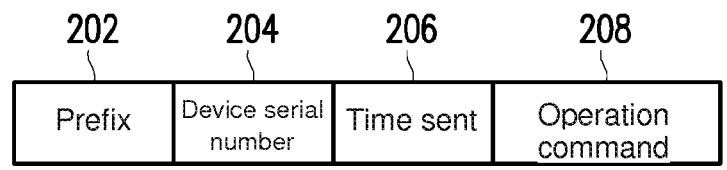
FIG. 2 is a schematic view of a short message format according to an embodiment of the present invention.

FIG. 2 is a schematic view of a short message format according to an embodiment of the present invention. Referring to FIG. 2, for example, short message MS1 includes multiple fields. In this embodiment, short message MS1 includes fields 202, 204, 206 and 208. The field 202 is a prefix, preferably an unencrypted field. The fields 204, 206 and 208 are encrypted fields. The field 204 and field 206 include certification data exemplarily. For example, the field 204 includes a device serial number of the communication apparatus, whereas the field 206 includes the time at which short message MS1 is sent. Furthermore, the field 208 includes an operation command for controlling the communication apparatus to execute an operation.

When the communication apparatus receives short message MS1, short message receiving unit 104 determines whether short message MS1 received by the communication apparatus conforms with the predetermined format. That is, determines whether short message MS1 includes the field 202 which conforms with predetermined prefix data. If short message MS1 includes the field 202 which conforms with predetermined prefix data, the short message receiving unit 104 will send short message MS1 to the short message managing unit 102 for decryption to obtain the device serial number, the time at which short message MS1 is sent, and operation command-related data. The short message managing unit 102 determines whether the device serial number in short message MS1 matches the device serial number of the communication apparatus and whether the interval between receiving short message MS1 and sending short message MS1 is shorter than a predetermined period of time. If the device serial number in short message MS1 does not match the device serial number of the communication apparatus or the interval between receiving short message MS1 and sending short message MS1 is not shorter than the predetermined period of time, short message managing unit 102 will not instruct the communication apparatus to execute an operation (for example, start the global positioning function or lock the screen) corresponding to an operation command, thereby preventing the other persons who are ignorant of the device serial number from sending short message MS1 to the communication apparatus to effectuate operation and control.

Furthermore, setting a predetermined period of time renders the use of short message MS1 time-dependent and thus further enhances data security. If an user sends data indicative of the time at which short message MS1 is sent and the device serial number with an operation command compiled by an electronic device (i.e., a communication apparatus, such as a mobile phone or a computer) other than the communication apparatus, the electronic device which is sending short message MS1 will automatically include the time at which short message MS1 is sent and the device serial number in short message MS1. Moreover, in yet another variant embodiment, the validity of short message MS1 is evaluated and determined according to whether the device serial number in short message MS1 matches the device serial number of the communication apparatus or whether the time at which short message MS1 is sent is shorter than the predetermined period of time.

Figure 3:
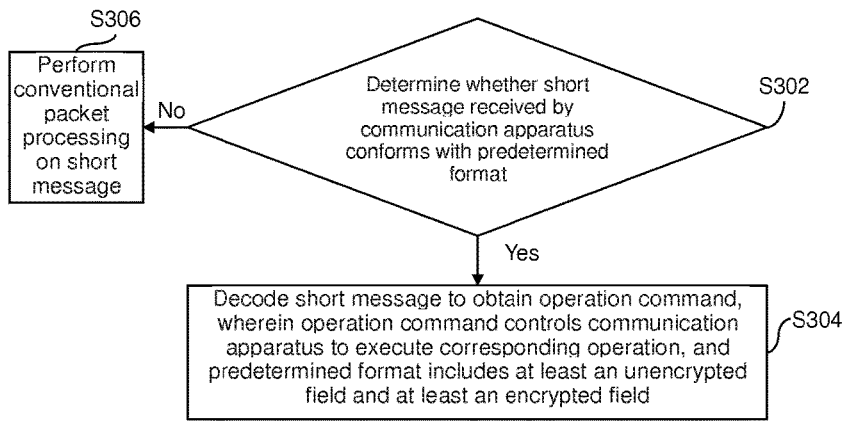
FIG. 3 is a flow chart of a setting method of a communication apparatus according to an embodiment of the present invention.

FIG. 3 is a flow chart of a setting method of a communication apparatus according to an embodiment of the present invention. Referring to FIG. 3, as indicated by the above embodiment, a setting method of a communication apparatus comprises the steps of: determining whether a short message received by the communication apparatus conforms with the predetermined format (step S302); and decoding the short message to obtain an operation command if the short message received by the communication apparatus conforms with the predetermined format, wherein operation command controls the communication apparatus to execute a corresponding operation, and the predetermined format includes at least an unencrypted field and at least an encrypted field (step S304). The essential technical features of the present invention are further described below. The short message is always processed in the framework layer and thus never sent to the application layer for processing, and in consequence the communication apparatus does not broadcast any video signal to notify users when controlling, with a short message, the communication apparatus to operate, not to mention that third parties are unlikely to intercept the short message in an attempt to access data contained in the short message, thereby effectively enhancing the security of the communication apparatus. By contrast, if the short message received by the communication apparatus does not conform with the predetermined format, conventional packet processing is performed on the short message (step S306).

Figure 4:
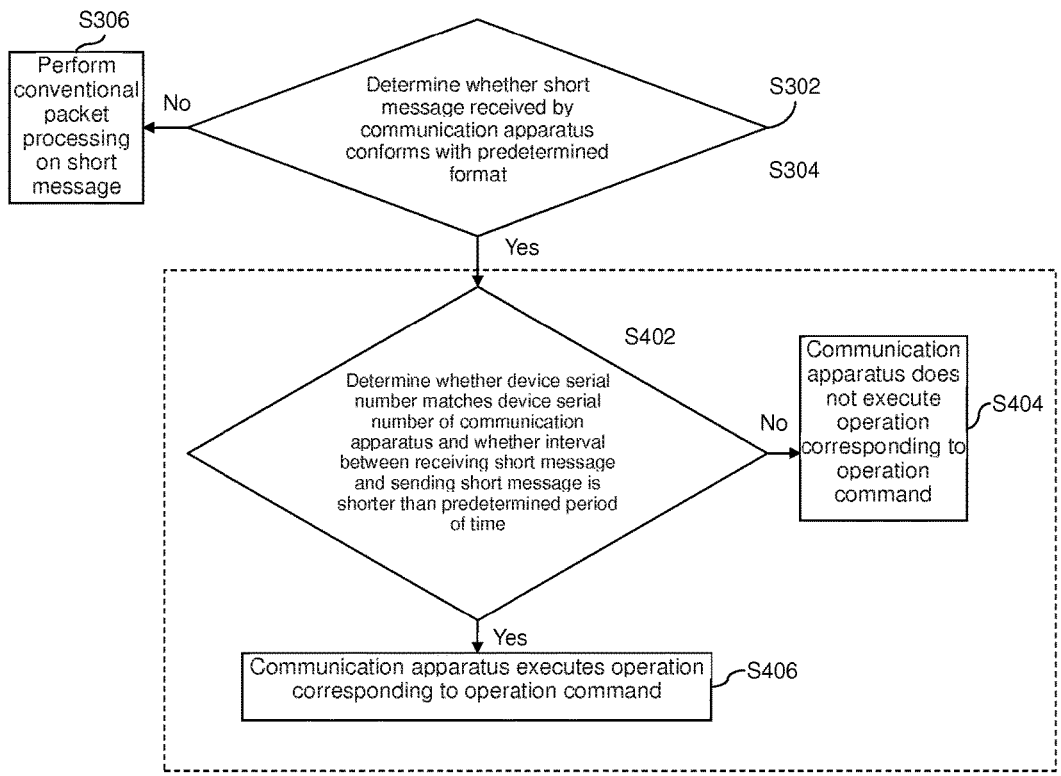
FIG. 4 is a flow chart of the setting method of a communication apparatus according to another embodiment of the present invention.

FIG. 4 is a flow chart of the setting method of a communication apparatus according to another embodiment of the present invention. Referring to FIG. 4, the unencrypted field is a prefix, and the encrypted field includes at least a certification data and the operation command. The at least a certification data includes the device serial number and the time at which the short message is sent, but the present invention is not limited thereto. The short message is sent to the communication apparatus after being included with the at least a certification data and encrypted. Step S304 further comprises the sub-steps of: determining whether the device serial number matches the device serial number of the communication apparatus and whether the interval between receiving the short message and sending the short message is shorter than a predetermined period of time (step S402); if the device serial number does not match the device serial number of the communication apparatus or the interval between receiving the short message and sending the short message is not shorter than the predetermined period of time, the communication apparatus will not execute an operation corresponding to an operation command (step S404); and if the device serial number matches the device serial number of the communication apparatus and the interval between receiving the short message and sending the short message is shorter than the predetermined period of time, the communication apparatus will execute an operation corresponding to an operation command (step S406). In a variant embodiment of the present invention, it is feasible to determine whether the short message is valid according to whether the device serial number of the short message matches the device serial number of the communication apparatus or whether the interval between receiving the short message and sending the short message is shorter than a predetermined period of time. Hence, it is feasible to determine whether to execute an operation corresponding to an operation command according to whether the device serial number of the short message matches the device serial number of the communication apparatus or whether the interval between receiving the short message and sending the short message is shorter than a predetermined period of time.

In conclusion, in an embodiment of the present invention, if a short message received by a communication apparatus conforms with a predetermined format, the communication apparatus will decode the short message to obtain an operation command. The operation command controls the communication apparatus to execute a corresponding operation. The predetermined format includes at least an unencrypted field and at least an encrypted field. Hence, by sending the short message, it is feasible to enhance the ease of use of the communication apparatus greatly by operating and controlling the communication apparatus. The encrypted field and the predetermined format of the short message are effective in ensuring the security of the data of the communication apparatus. The encrypted field of the short message includes, for example, the device serial number and the time at which the short message is sent. Hence, by determining the validity of a short message, it is feasible to further augment the security of the data of the communication apparatus.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A communication apparatus, comprising:
   a processor; and
   a memory device, storing:
   a short message receiving module configured to, when executed by the processor,
   determine whether a short message received by the communication apparatus conforms with a predetermined format, wherein the short message comprises an unencrypted prefix and multiple encrypted fields including a serial number to match a device serial number of the communication apparatus, a time at which the short message is sent and an operation command that controls the communication apparatus to execute a corresponding operation;
   if the unencrypted prefix of the short message conforms with predetermined prefix data, send the short message to a short message managing module, executed by the processor, for decryption to obtain the serial number to match the device serial number of the communication apparatus and the time at which the short message is sent and the operation command; and
   if the short message does not conform with the predetermined prefix data, send the short message to a short message processing module;
   the short message managing module configured to, when executed by the processor,
   receive the short message in a framework layer from the short message receiving module if the short message conforms with the predetermined format; and
   decode the short message to obtain the operation command only in the framework layer; and
   the short message processing module configured to, when executed by the processor,
   receive the short message from the short message receiving module if the short message does not conform with the predetermined format; and process the short message only in an application layer, wherein the predetermined format includes at least an unencrypted field and at least an encrypted field.

2. The communication apparatus of claim 1, wherein the at least an unencrypted field is the unencrypted prefix, and the at least an encrypted field includes at least a certification data and the operation command.

3. The communication apparatus of claim 2, wherein the certification data includes the serial number and the time at which the short message is sent.

4. The communication apparatus of claim 3, wherein the short message managing module is further configured to determine whether the serial number matches the device serial number of the communication apparatus and whether an interval between receiving the short message and sending the short message is shorter than a predetermined period of time, wherein, if the interval is not shorter than the predetermined period of time, the communication apparatus will not execute an operation corresponding to the operation command.

5. The communication apparatus of claim 4, wherein, if the short message managing module determines that the serial number does not match the device serial number of the communication apparatus, the communication apparatus will not execute the operation corresponding to the operation command.

6. A setting method of a communication apparatus, the setting method comprising the steps of:
  determining whether a short message received by the communication apparatus conforms with a predetermined format, wherein the short message comprises an unencrypted prefix and multiple encrypted fields including a serial number to match a device serial number of the communication apparatus, a time at which the short message is sent and an operation command that controls the communication apparatus to execute a corresponding operation;
  receiving the short message in a framework layer if the unencrypted prefix of the short message conforms with predetermined prefix data;
  decoding the short message to obtain the serial number to match the device serial number of the communication apparatus, the time at which the short message is sent and the operation command only in the framework layer if the prefix of the short message conforms with the predetermined prefix data; and
  processing the short message only in an application layer if the short message does not conform with the predetermined format, wherein the predetermined format includes at least an unencrypted field and at least an encrypted field.

7. The setting method of a communication apparatus according to claim 6, wherein the at least an unencrypted field is the unencrypted prefix, and the at least an encrypted field includes at least a certification data and the operation command, and the short message is sent to the communication apparatus after being included with the at least a certification data and encrypted.

8. The setting method of a communication apparatus according to claim 7, wherein the certification data includes the device serial number and the time at which the short message is sent.

9. The setting method of a communication apparatus according to claim 7, further comprising:
  determining whether the serial number matches the device serial number of the communication apparatus and whether an interval between receiving the short message and sending the short message is shorter than a predetermined period of time; and
  not executing an operation corresponding to the operation command by the communication apparatus if the interval is not shorter than the predetermined period of time.

10. The setting method of a communication apparatus according to claim 9, further comprising not executing an operation corresponding to the operation command by the communication apparatus if the serial number does not match the device serial number of the communication apparatus.

* * * * *